United States Patent Office 2,728,679
Patented Dec. 27, 1955

2,728,679

A METHOD OF PREPARING A LIQUID POLISH

Charles S. Wright, Crystal Lake, Ill., assignor to The Pure Oil Company, Chicago, Ill., a corporation of Ohio No Drawing. Application August 17, 1951,
Serial No. 242,419

13 Claims. (Cl. 106—10)

This invention relates to a method of dissolving a vegetable wax. More particularly, the invention relates to the preparation of a liquid automobile polish capable of imparting a durable protective coating of high luster to the painted surface of the automobile without the necessity of excessive rubbing or buffing.

Liquid polishes comprising a wax dissolved or suspended in a liquid medium such as petroleum naphtha, turpentine, or water are well known. The wax commonly used in these compositions is carnauba wax, either alone or in combination with other waxes such as paraffin, microcrystalline petroleum wax, candelilla, raphia, palm, beeswax, ceresin, Japan, montan, ouricuri, sugar cane, and esparto. In some instances, waxes such as palm, ouricuri, sugare can, and candelilla are substituted in part or entirely for the carnauba wax.

The principal drawback to known liquid wax preparations suitable for use as automobile polishes is the fact that they require excessive rubbing or buffing in order to impart a high luster to the waxed surfaces. This has been found to be due to the fact that the wax is present in the liquid vehicle in the form of large crystals or coarse grains.

Some hard vegetable wax polishes have incorporated in them soap which reduces the particle size of the wax suspension, but such polishes are not suitable for outdoor purposes. I have found a method of reducing the wax particle to microcrystalline size without the aid of soaps and of preparing polish which can be easily buffed or rubbed to a high luster.

An object of this invention is to provide a method of preparing a liquid wax which requires only light rubbing to produce a high luster finish.

In accordance with my invention, a suitable vegetable wax such as carnauba, candelilla, sugar cane, palm, or ouricuri, either alone or admixed with each other and/or with other types of wax such as paraffin, is heated with an alcohol in which the wax is sparingly soluble at low temperatures but in which the wax is readily soluble at high temperatures, until the wax goes into solution. Of alcohols that may be used, I prefer iso-propyl, but other mono-hydric alcohols having from three carbon atoms up to those which are solid at ambient temperature may be used. As examples may be mentioned decyl and tertiary butyl alcohols. Methyl and ethyl alcohols are not suitable because of the low solubility of the wax therein at boiling temperature of the alcohol. Sufficient solvent is used so that the resulting solution, upon cooling to about room temperature, will form a product of buttery consistency. The resulting product is mixed with a suitable vehicle such as petroleum naphtha, chloroform, turpentine, carbon disulfide or acetone in which the wax is sparingly soluble to produce a suspension of the desired consistency. The vehicle may be added to the alcohol-wax mixture prior to or after it has cooled to ambient temperature. However, I prefer to add the vehicle to the hot wax-alcohol solution to bring about precipitation of the microcrystalline wax. Care should be exercised when using vehicles such as carbon disulfide or chloroform not to bring them into contact with hot wax-alcohol solution because of the danger from fire and/or evaporation of noxious fumes. If desired, a plasticizing material such as boiled linseed oil and/or organic silicon polymerization or condensation products such as the silicone oils referred to in Patent No. 2,447,483 or wax-like organic silicon polymeric products, such as those disclosed in Patent No. 2,407,181, may be added to the liquid polish at any stage in the preparation thereof. For example, linseed oil may be added to the wax prior to the time it is dissolved in the initial solvent; or the boiled linseed oil may be added with the wax-alcohol mixture to the petroleum naphtha or other vehicle in which it is to be suspended.

I have found that if the wax is first dissolved in a solvent in which it is sparingly soluble at ambient temperature, upon cooling the hot solution the wax precipitates in a microcrystalline form. If the amount of solvent used is such as to produce a buttery mass upon cooling the solution, the resulting solution or buttery mass can be readily suspended in the petroleum naphtha or other vehicle to produce the finished polish. Upon standing, some or all of the wax particles may settle out of the vehicle, but become readily suspended again upon shaking.

*Example 1.*—20 parts by weight of carnauba wax were boiled under a reflux condenser with 80 parts by weight of iso-propyl alcohol until a clear solution was obtained. To the resultant solution before cooling was added a mixture of 800 parts by weight of V M & P naphtha, 10 parts by weight of boiled linseed oil and 10 parts of silicone oil having a viscosity of 300 centistokes at 100° F. The resulting suspension makes an excellent polish for surfaces such as automobiles, refrigerators and show cases.

*Example 2.*—20 parts by weight of #1 carnauba wax were mixed with 3 parts by weight of boiled linseed oil and 50 parts by weight of iso-propyl alcohol. The mixture was heated to boiling in a reflux condenser until the carnauba wax was dissolved. The resulting solution was cooled to ambient temperature whereupon it formed a buttery mass. This buttery mass was then suspended in 180 parts by weight of V M & P naphtha.

*Example 3.*—Compositions were also prepared by boiling and dissolving 5 parts by weight of carnauba wax in 20 parts by weight of each, iso-propyl alcohol, decyl alcohol, and tertiary butyl alcohol. To each of the resulting solutions was added 50 parts by weight of V M & P naphtha. In each case a satisfactory microcrystalline suspension was obtained.

*Example 4.*—Suspensions were also made in accordance with the procedure outlined in Example 3 in which candelilla, sugar cane, palm and ouricuri waxes were substituted for carnauba wax. In each case the procedure gave a suitable microcrystalline product.

The alcohol used in producing the microcrystalline wax may be selected in accordance with the purpose for which the product is intended. Thus, where the product is intended as automobile polish, a relatively volatile alcohol which is not injurious to the painted surface should be selected. On the other hand where wax is used to coat surfaces for protective purposes only, a less volatile alcohol can be used.

Instead of using petroleum naphtha as the vehicle for the wax, other vehicles in which the wax is sparingly soluble at ambient temperatures, which will evaporate or dry within a short period of time, and which are not injurious to the surface to which the polish is to be applied may be used. Vehicles in which the wax is soluble to the extent of less than 7% by weight are suitable. Vegetable waxes which have a solubility of less than 7% by weight in V M & P naphtha may be treated in accordance with my invention.

When dissolving the wax in the solvent in the initial step, solution should take place either in a closed vessel or in a vessel supplied with a reflux condenser in order to prevent loss of solvent during heating.

It is important that the preparation of the polish be carried out in two steps, in the first of which only sufficient solvent is used to produce a buttery mass upon cooling which insures the production of the wax in the microcrystalline form and, in the second step, sufficient vehicle is added to the solution or buttery mass to produce a suspension of the desired fluidity and consistency. It will be apparent that more or less naphtha or other vehicle than that given in the specific examples may be used, depending on the consistency desired in the final product and that likewise the amount of plasticizing agent, silicone oil and paraffin, if added, can be varied to obtain a wax film of the desired hardness or other desired property.

What is claimed is:

1. The method of preparing a microcrystalline wax composition comprising dissolving a vegetable wax in normally liquid mono-hydric alcohol having at least 3 carbon atoms in the molecule, mixing the wax and alcohol in amounts to give a buttery mass upon cooling the resultant solution to about room temperature, heating the mixture to a temperature sufficient to dissolve the wax, and mixing the alcohol and wax with a volatile organic vehicle in which said wax is sparingly soluble but soluble to the extent of less than 7 per cent by weight at ambient temperature in an amount such as to produce a suspension of the wax in the vehicle.

2. Method in accordance with claim 1 in which the wax is selected from the group consisting of carnauba, candelilla, palm, ouricuri and sugar cane.

3. Method in accordance with claim 1 in which the alcohol is iso-propyl alcohol.

4. Method in accordance with claim 1 in which the organic vehicle is petroleum naphtha.

5. The method of preparing a microcrystalline wax composition comprising dissolving a vegetable wax in normally liquid mono-hydric alcohol having at least 3 carbon atoms in the molecule, mixing the wax and alcohol in amounts to produce a buttery mass upon cooling the resultant solution to about room temperature, heating the mixture to a temperature sufficient to dissolve the wax, and mixing the alcohol and wax with a volatile organic vehicle selected from the groups consisting of petroleum naphtha, chloroform, turpentine, carbon disulfide and acetone in an amount such as to produce a suspension of the wax in the vehicle.

6. Method in accordance with claim 5 in which the wax is selected from the group consisting of carnauba, candelilla, palm, ouricuri and sugar cane.

7. Method in accordance with claim 6 in which the vehicle is petroleum naphtha.

8. Method in accordance with claim 7 in which the wax is carnauba.

9. Method in accordance with claim 8 in which the alcohol is isopropyl.

10. Method in accordance with claim 5 in which the solution of wax in alcohol is cooled by adding the vehicle to the hot solution.

11. Method in accordance with claim 5 in which boiled linseed oil is mixed with the other constituents.

12. Method in accordance with claim 5 in which silicone oil having a viscosity of 300 centistokes at 100° F. is mixed with the other constituents.

13. Method in accordance with claim 11 in which silicone oil having a viscosity of 300 centistokes at 100° F. is mixed with the other constituents.

References Cited in the file of this patent

UNITED STATES PATENTS

| | | |
|---|---|---|
| 1,605,041 | Kritchevsky | Nov. 2, 1926 |
| 1,974,854 | Schrauth | Sept. 25, 1934 |
| 2,009,345 | Schrauth | July 23, 1935 |
| 2,311,338 | Holtzclaw et al. | Feb. 16, 1943 |
| 2,324,671 | Bernstein | July 20, 1943 |
| 2,519,321 | Newman | Aug. 15, 1950 |
| 2,596,829 | Trusler | May 13, 1952 |
| 2,598,666 | Sesso et al. | June 3, 1952 |
| 2,614,049 | Swanson | Oct. 14, 1952 |